United States Patent [19]
Suzuki et al.
[11] 3,821,797
[45] June 28, 1974

[54] SYSTEM FOR RECORDING AND REPRODUCING A WIDE-BAND SIGNAL

[75] Inventors: Takahiro Suzuki; Yoshihiko Ota, both of Tokyo, Japan

[73] Assignee: Victor Company of Japan, Ltd., Yokohama, Japan

[22] Filed: Dec. 20, 1972

[21] Appl. No.: 316,741

Related U.S. Application Data

[63] Continuation of Ser. No. 42,958, June 3, 1970, Pat. No. 3,723,643, which is a continuation of Ser. No. 773,848, Nov. 6, 1968, abandoned.

[30] Foreign Application Priority Data

Nov. 8, 1967 Japan .............................. 42-71386
June 6, 1969 Japan .............................. 44-44133

[52] U.S. Cl. .................... 360/24, 360/27, 360/30, 360/66
[51] Int. Cl. ........................................ G11b 5/04
[58] Field of Search.......... 179/100.2 MD, 100.2 K, 179/100.2 T; 178/6.6 A

[56] References Cited

UNITED STATES PATENTS

| | | | |
|---|---|---|---|
| 2,809,238 | 10/1957 | Fay | 179/100.2 T |
| 2,909,596 | 10/1959 | Fay | 178/6.6 A |
| 3,381,083 | 4/1968 | Jensen et al. | 179/100.2 K |
| 3,392,233 | 7/1968 | Houghton | 178/6.6 A |
| 3,482,038 | 12/1969 | Warren | 178/6.6 A |

OTHER PUBLICATIONS

R.C.A. Technical Note No. 240

*Primary Examiner*—Vincent P. Canney
*Assistant Examiner*—Alfred H. Eddleman

[57] ABSTRACT

A tape recorder has the capability of recording a predetermined band width of signals which is not as wide as a TV band width. To record a TV band, the signals are divided into high and low component band. The high frequency band component is recorded directly on the recording medium, and the low frequency band component is frequency modulated on a carrier wave with an index of modulation which is over unity. The lower frequency limit of the deviated carrier wave is substantially equal to or higher than the highest frequency component of the wide-band signal. The frequency modulated carrier wave is recorded on the recording medium at a level at which it acts as a bias signal with respect to the high frequency band component. The original wide-band signal is reproduced from the recording medium during playback when the component bands are separated, demodulated, and recombined. The high frequency band component played back from the recording medium is controlled by other frequency component played back at the same time so that the level variations of the high frequency band component is corrected.

10 Claims, 11 Drawing Figures

PATENTED JUN 28 1974 3,821,797

SYSTEM FOR RECORDING AND REPRODUCING A WIDE-BAND SIGNAL

This application is a continuation of application Ser. No. 42,958, filed June 3, 1970, now U.S. Pat. No. 3,723,643, which was a continuation of application Ser. No. 773,848, filed Nov. 6, 1968, now abandoned.

The present invention relates to systems for recording and reproducing a wide-band signal, and more particularly to systems for magnetically recording and reproducing a wide-band signal, such as a video signal for television, for example.

One type of magnetic recording and reproducing system is known in the art as a "direct recording system". Here, a fixed magnetic head records and reproduces a signal on a moving magnetic medium, together with a high frequency bias signal. During playback, the output voltage of a magnetic head is proportional to a change of the magnetic flux moving across the gap of the magnetic head with respect to time and to the number of turns of the coil on the magnetic head. Therefore, the output voltage during playback is proportional to the frequency, at a rate of 6 db/octave.

Accordingly, when a recording of a wide-band signal, such as a video signal for television, for example, is played back, the output voltage of a low frequency component of the signal becomes very weak as compared with the output voltage of a high frequency component of the signal. This weakness causes a marked degradation of the signal-to-noise ratio. In particular, the DC component of the video signal is almost not transmitted thereby it is almost impossible to maintain a high level quality of the picture image. There is a resulting degradation of the reproduced television picture image. Thus, it is impossible to reproduce picture images of good quality.

Usually, a rotary magnetic head system is used for recording wide-band signals. A carrier wave is frequency modulated by a signal to be recorded. Then a rotary magnetic head records the frequency modulated carrier wave on a magnetic medium. The heads rotate at a rate which is higher than the rate of movement of the magnetic medium.

This usual system is not without disadvantages. During playback of frequencies above a given frequency, the output voltage decreases and there is a further decrease as the frequency increases. This decrease occurs because there are high frequency losses inherent in the magnetic heads and the magnetic medium. This makes it impossible to cause frequency deviation over a wide range of the frequency modulated carrier wave. Thus, it is customary for the index of modulation to be less than 0.5. For this reason, the energy is reduced in the sideband wave containing the signal components. Consequently, the maximum frequency of the sideband wave is restricted in order that the signal-to-noise ratio may be maintained at a satisfactory level. Thus, it is impossible to provide a wide frequency band to a video signal.

The present invention overcomes all of the disadvantages which are described above.

According to the invention, a wide-band signal, which is to be recorded on a magnetic medium is divided into a low frequency band component and a high frequency band component. The high frequency band component is recorded directly on the magnetic medium. The low frequency band component is modulated on a frequency modulated carrier wave. During the frequency modulation, an index of modultion is used which is much higher than the index of modulation used in the conventional rotary magnetic head system. The lower frequency deviation limit of the FM carrier wave is substantially equal to or higher than the highest frequency component of the wide-band signal. The frequency modulated carrier wave is recorded on the magnetic medium at a level at which it acts as a bias signal, with respect to the high frequency band component.

In a system embodying the present invention, it is possible to use an index of modulation which is higher than the index in the conventional rotary magnetic head system because the carrier wave is frequency modulated by the low frequency band component of the signal and not by the signal itself. One inherent characteristic of such a high index of modulation is that the sideband of the frequency modulated carrier wave can have a higher energy. Accordingly, it is possible to raise the highest frequency of the sideband wave. Otherwise, this frequency would be restricted from the viewpoint of maintaining a signal-to-noise ratio at a satisfactory level. This permits the recording of a signal at a high frequency band. Hitherto, this has been impossible in the conventional frequency modulation recording system. Therefore, the utilization of the frequency band is greatly improved in the inventive system.

In systems embodying the present invention, it is also possible to directly record the aforementioned high frequency band component in the frequency band as recorded in the conventional system. The frequency modulated carrier wave is recorded in a frequency band which is higher than said frequency band that can be recorded by the conventional system. In this case, the frequency modulated carrier wave is recorded in a frequency band of low signal-to-noise ratio, but recording can be accomplished at the saturation level of the magnetic medium because the frequency modulated carrier wave has a constant amplitude. When this saturation level capability is combined with a higher index of modulation, the signal-to-noise ratio is maintained at a satisfactory level.

The frequency modulated carrier wave, recorded at the saturation level, acts as a bias signal with respect to the high frequency band component which is directly recorded without modulation. Therefore, the high frequency band component is recorded linearly, and it is recorded at a high level of sensitivity. Thus, it is possible to record the high frequency band component at a level which is lower than the level at which the frequency modulated carrier wave is recorded. The difference between the recording levels may be in the order of 10 decibels.

From the foregoing description, it will be evident that this invention enables the recording of a wider than conventional frequency band on a magnetic medium. Thus, it is possible to record and reproduce signals of a wider frequency band than has hithereto been possible.

In general, there are many reasons why the FM system is superior to the AM system, depending upon the purposes and frequencies adopted by these systems. More particularly, the FM systems used in video tape recorders have the following two representative advantageous effects.

First, the FM system improves a signal-to-noise ratio. This advantage cannot be obtained unless the modulation index of FM is larger than a certain predetermined value. In general, commercially available recorders have modulation index values for the FM recording system which are in the order of 0.2 to 0.5. However, substantially no advantageous effects could be obtained by these modulation index values. On the contrary, the modulation index values for the FM recording systems adopting my invention are at least 1, which provides an improvement in the signal-tO-noise ratio.

Second, the FM system is capable of maintaining a carrier wave in an extremely stable state, with almost no inherent amplitude variation thereof.

The system embodying the present invention makes it possible to reduce the rotation rate of the magnetic heads relative to the rate of movement of the magnetic medium. Despite this reduction of rotation rate, the recording signals are comparable to those of the frequency band recorded by the conventional system. Thus, it is possible to reduce, by about 30 percent, the diameter of the rotary disc on which the magnetic heads are mounted. Or, it is also possible to reduce the rate of movement of the magnetic medium by about 30 percent. Either way, there is a resulting reduction of about 30 percent in the amount of the magnetic medium which is used. The use of a rotary magnetic disc of a smaller diameter, rotating at high speed, permits an overall smaller size magnetic recording and reproducing apparatus. The reduced size also facilitates the manufacture of the apparatus.

There is an additional disadvantage in the conventional frequency modulation system. Since the highest frequency of a video signal is approximately equal to the frequency of the carrier wave, cross talk between the signal and carrier is likely. The frequency of the sideband wave on the frequency modulated carrier wave, which is frequency modulated by a signal component in the neighborhood of the highest TV signal frequency, finds its way into the frequency band of the video signal, and interference occurs between the two signals.

An interfering signal, such as a beat signal, is liable to be produced, particularly, in the case of a color television signal having a high energy color subcarrier wave with a high frequency of 3.58 MC. The sideband component of the color subcarrier wave interferes with the color video signal and a beat signal is generated. The result is the occurrence of a moire in the reproduced picture. However, in the system embodying the present invention, the color subcarrier wave is recorded as it is on a magnetic medium without being frequency modulated. Thus, a picture image of superb quality, can be reproduced without the occurrence of a moire.

Still another factor to consider is that the video tape recorder makes use of a transmission system comprising a magnetic tape and a magnetic head. Thus, any difference in the nature of the contact between the magnetic tape and the magnetic head causes the signal to change its level. The tracking error causes changes in amplitude of the signal. Especially, in the video tape recorder using a plurality of magnetic heads as of the two rotary magnetic head system, in case that the characteristics of the magnetic heads are different each other, amplitude differece are caused in the signals reproduced respectively by the magnetic heads. Any stretch of the magnetic tape causes the signal to drop out. All of these factors subject the signal to variations of the signal levels. Therefore, as the signal passes through the transmission system, it becomes extremely unstable.

An AM transmission system is not able to prevent these variations of the signal levels. Also, the AM transmission system transfers the level variations as items of information. Thus, in an AM system, it is impossible to distinguish between the level variations which occur owing to the outside influences and the variations which occur responsive to the level variations which are transmitted as the items of information.

On the contrary, the FM transmission system does not transmit items of information responsive to the level variations. After having been passed through the transmission system, the signals pass through an amplitude limiter circuit which reduces the level variations to zero. As a result, the signals are subjected to level variations during transmission, but they can be demodulated without regard to the level variations.

The basic operation is to remove the level variations with the aid of the amplitude limiter. Then, the FM signal is demodulated, and it plays an extremely important role in the video tape recorder transmission system. This is perhaps, one of the most important advantages of the FM system. Hence, it is one of the reasons whey the FM system is superior to the AM system.

On the other hand, in case there is a tracking error, the difference between the characteristics of the magnetic heads, and the difference of the contact between the magnetic tape and the magnetic head with relation to the factor of the video tape recorder, the reproduced high frequency band component also has amplitude variations.

However, as the high frequency band component which is directly recorded and reproduced has its inherent amplitude variations as items of the information, it is impossible to remove the amplitude variations only caused by the outside influences out of the high frequency band component through the amplitude limiter.

Here, the frequency modulated low frequency band component which is reproduced together with the high frequency band component has the same amplitude variations caused by the outside influences as that of the high frequency band component. Out of the amplitude variations of the high frequency band component, the unnecessary variations which occur owing to the outside influences are the same as the ampltidue variations of the FM low frequency band component. Then the amplitude variations are taken out from the low frequency band component. The amplitude of the high frequency band component is controlled and corrected by the thus taken amplitude variations. Thus it is possible to obtain the high frequency band component which is removed of its unnecessary amplitude variations and has only the amplitude variations of items of information per se. In recording and reproducing of a color video signal having a pilot signal, the high frequency band component may be corrected by amplitude variations of the pilot signal.

Accordingly, an object of the present invention is to provide a recording and reproducing system which permits transmission of a signal of a wider frequency band than has hitherto been possible in the conventional system.

Another object of the present invention is to provide a recording and reproducing system which makes the best use of the transmittable frequency band of the conventional recording and reproducing system.

Still another object of the invention is to provide a recording and reproducing system which is free from a disturbance, in the reproduced picture image, caused by a beat signal.

A further object of the invention is to provide a recording and reproducing system in which less recording medium is employed, as compared with the amount used in the conventional system.

A still further object of the invention is to provide a recording and reproducing system which further reduces the overall small size in a recording and reproducing apparatus.

A still further object of the invention is to provide a recording and reproducing system which enables direct recording and reproduction of a signal without using a additional bias signal producing device.

A still further object of the invention is to provide a recording and reproducing system which corrects level variations of a signal directly recorded on and reproduced from the recording medium after it is divided from a wide-band signal. The rest of the divided wide-band signal is recorded on and reproduced from the recording medium together with the above described signal after it is frequency-modulated.

Additional objects and advantages of the invention will become apparent after the description hereafter set forth is considered in conjunction with the drawings annexed hereto, in which:

FIGS. 1 and 2 show a magnetic recording and reproducing apparatus which can be used for carrying the present invention into practice. The construction and operation of this apparatus will first be explained.

Figure 1:
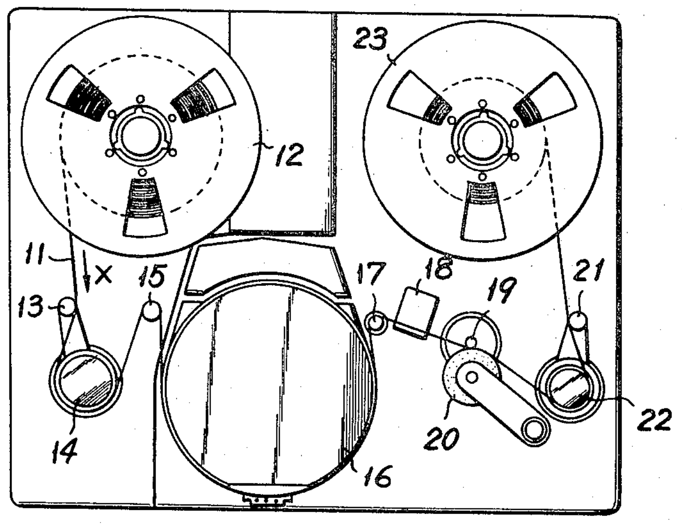
FIG. 1 is a plan view of one embodiment of the magnetic recording and reproducing apparatus of the two head type, which can be used for carrying the present invention into practice.

In FIG. 1, a magnetic tape 11 is unwound from a supply reel 12. Then the tape passes by a roller 14 (having a tension arm 13) and a guide roller 15. Next, the tape comes into contact with a guide drum 16 having built-in rotary magnetic heads. The tape moves over a path which wraps obliqely, about the guide drum through substantially half the circumference thereof. After being released from the guide drum, the magnetic tape 11 is passed by a guide roller 17 and brought into contact with a fixed magnetic recording and reproducing head block 18. The tape is pulled between a rotating capstan 19 and a rotating pinch roller 20, for movement in the direction of the arrow X. Thereafter, the tape is passed by a roller 22 having a tension arm 21, and wound on a take-up reel 23. The supply reel 12 is mounted at a position which is vertically higher than the position at which the take-up reel 23 is mounted.

Figure 2:
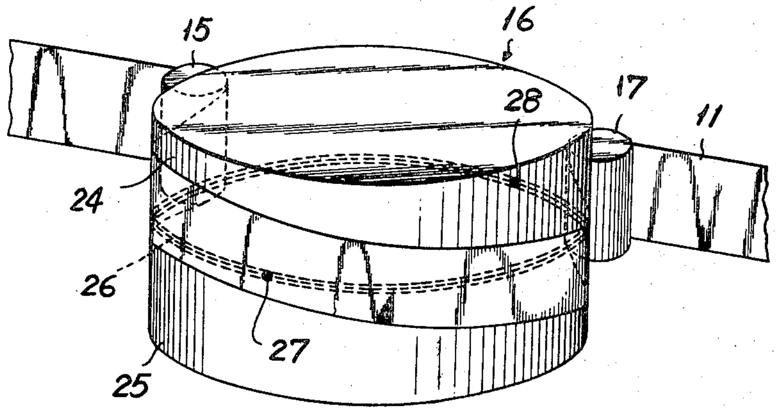
FIG. 2 is a perspective view showing a magnetic tape in contact with a guide drum portion of the apparatus shown in FIG. 1.

As shown in FIG. 2, the guide drum 16 consists of an upper drum portion 24 and a lower drum portion 25 with a space interposed threbetween. A rotary disc 26 is mounted for rotation at high speed within this space. Magnetic head 27 and 28 are mounted at its edge and at positions diametrically opposed to each other. The magnetic tape 11 is maintained in contact with the guide drum, obliquiely with respect to the axis of the drum. Thus, video signal tracks are recorded on the magnetic tape 11 by the magnetic heads 27 and 28. These tracks are formed as parallel lines disposed obliquely with respect to the longitudinal axis of the magnetic tape 11.

One embodiment of the recording system embodying the present invention will now be explained with reference to FIGS. 3 and 4. A video signal having a frequency band designated A in FIG. 4 is introduced through an input terminal 30. An amplifier 31 amplifies the signal and supplied it to a high-pass filter 32 and a low-pass filter 33, each having a cut-off freqeucny of 0.5 MHz. In this embodiment, the highest frequency of the video signal (A) assumed to be 4.2 MHz. The high frequency band component of the video signal, designated C in FIG. 4, in passed by the high-pass filter 32. Its frequency component is compensated by an equalization amplifier 34. Then, the high frequency band component (C) is passed through a delay line 35. Thus, it may be matched with the low frequency band component which experiences a time-lag in the low-pass filter 33. The high frequency component (C) has a gain adjusted by a gain control 36, and then it is supplied to a mixer 37. In cases where an input video signal has a frequency band which is wider than is necessary, a band-pass filter is used in place of the high-pass filter 32.

On the other hand, the low frequency band component, designated B in FIG. 4, is passed by the low-pass filter 33. It is amplified and has its DC component restored by an amplifier and DC component restorer 38. Then, the low frequency band component (B) is supplied to a frequency modulator 39 where it is frequency modulated. The frequency band of the carrier wave is deviated over a range extending from 4.8 to 7.8 MHz, as designated D in FIG. 4. In this case, the highest frequency contained in the low frequency band component (B) is 0.5 MHz. The deviation of the frequency of the carrier wave is one half of 3.0 MHz or 1.5 MHz. The frequency of 3.0 MHz is obtained by substracting 4.8 MHz from 7.8 MHz. Hence, the modulation index will be as follows:

$$\text{Index of Modulation} = \frac{\text{Deviation of the Frequency of Carrier Wave}}{\text{Highest Modulated Frequency}} = \frac{1.5}{0.5} = 3$$

In this case, the lower frequency limit of the deviated carrier wave is selected so that it is equal to or slightly higher than the highest frequency of the video signal (A).

There are a number of factors to weigh when selecting the frequency for dividing the wide band signals. The inventive system divides the wide band signal at the frequency 0.5 MHz. If the wide band signal is a television signal, the phase characteristic of the television signal is a particularly important element. As the dividing frequency becomes lower, the phase characteristic of the dividing filter elements becomes difficult to control because the coils and capacitors become larger. It is difficult to obtain good filter elements of these large sizes. It is necessary to provide a delay time for one of the two divided frequency bands in order to bring it into coincidence with the other divided frequency band. The present system requires a delay time of about 2 $\mu$ sec. This is much easier to obtain than say 80 $\mu$ sec. for an AM system. The subject system provides for recording frequency bands of 0.5 MHz to 7.8 MHz (represented by less than 4 octaves) on the magnetic tape.

The magnetic recording and reproducing signal causes the reproduced output to increase at a rate of 6 dB per octave, with respect to the frequency. The inventive system is capable of reproducing the lowest frequency of 0.5 MHz with respect to the highest frequency of 7.8 Mhz with a level of −24 dB, thus making the signal-to-noise ratio 24 dB. The inventive system provides 4 octaves per band, which is superior to other systems providing 8 octaves.

An AM system could not provide such a dividing frequency of 0.5 MHz with only 4 octaves for the wide band frequency signals. If the octave range becomes narrower, the difference in the signal-tO-noise ratios between the highest frequency and the lowest frequency becomes smaller. If the dividing frequency of an AM system is made 0.5 MHz, then, the sidebands become ±0.5 MHz with respect to the AM carrier. Thus, the band width of the AM carrier becomes forty times wider than it would be if the dividing frequency were 12 KHz. As a result, the signal-to-noise ratio is deteriorated by 32 dB. As seen from the above, it is impossible to improve the signal-to-noise ratio by means of an AM system. Even though the dividing frequency is made 0.5 MHz, the signal-to-noise ratio of the AM system deteriorates remarkably. Thus, AM system cannot be used, in practice.

The frequency modulated signal is supplied to the mixer 37 after having its unnecessary component removed by a band-pass filter 40 and having its gain adjusted by a gain control 41. The high frequency band, component (C), of the video signal transmitted from the gain control 36 and the frequency modulated signal, component (D), transmitted from the gain control 41 are mixed in the mixer 37. The signal having a frequency band designated E in FIG. 4 is taken out as an output. The output of the mixer 37 is transmitted to recording amplifiers 42 and 43 where it is amplified. The amplified mixed signal is alternately applied to the magnetic heads 27 and 28 so that the mixed signal may be recorded in oblique tracks on the magnetic tracks on the magnetic tape 11.

In the system embodying the present invention, the index of modulation can be made higher if there is a lower boundary frequency at which a video signal is divided into a low frequency band component and a high frequency band component (which is 0.5 MHz in this embodiment). If the boundary can be made lower, there is an improved signal-to-noise ratio of the reproduced signal. On the other hand, this makes it necessary to use a circuit of a complicated design. Otherwise, there is a poor frequency response with respect to an input signal for high fidelity recording and reproduction of the signal. This also makes it increasingly difficult to bring about an agreement in the signal level of the low frequency band component and the high frequency band component. Accordingly, the boundary frequency is preferably selected so that it is higher than about 0.1 MHz but lower than one half the highest frequency of a video signal to be recorded. Moreover, the index of modulation is preferably over unity, since the signal-to-noise ratio is improved when the index of modulation of the frequency modulated carrier wave is higher, as aforementioned.

The bias signal with respect to the high frequency component of a video signal that is directly recorded need not have a constant frequency. Therefore, it is possible to make the frequency modulated carrier wave act as a bias signal with respect to the high frequency band component. The frequency modulated carrier wave is recorded at a saturation level on the magnetic tape. This carrier preserves the linearity of recording with respect to the high frequency band component. Moreover, the sensitivity of the recording of the high frequency band component is increased by the aforementioned biasing action. Thus, the high frequency band component of the signal has only to be applied to the magnetic heads 27 and 28 at a level which is approximately ten decibels lower than the level of the frequency modulated carrier wave.

It is thought that some of the above-mentioned significant aspects of the invention are worthy of review at this point in the description so that the advantages of the invention may be more fully appreciated. This review may be supplemented by reference to any good text book on frequency modulation, such as "Radio Electronics" (Chapter 14) by Samuel Seely, McGraw-Hill Book Company, Inc. (Chapter 1956).

Figures 10, 11:
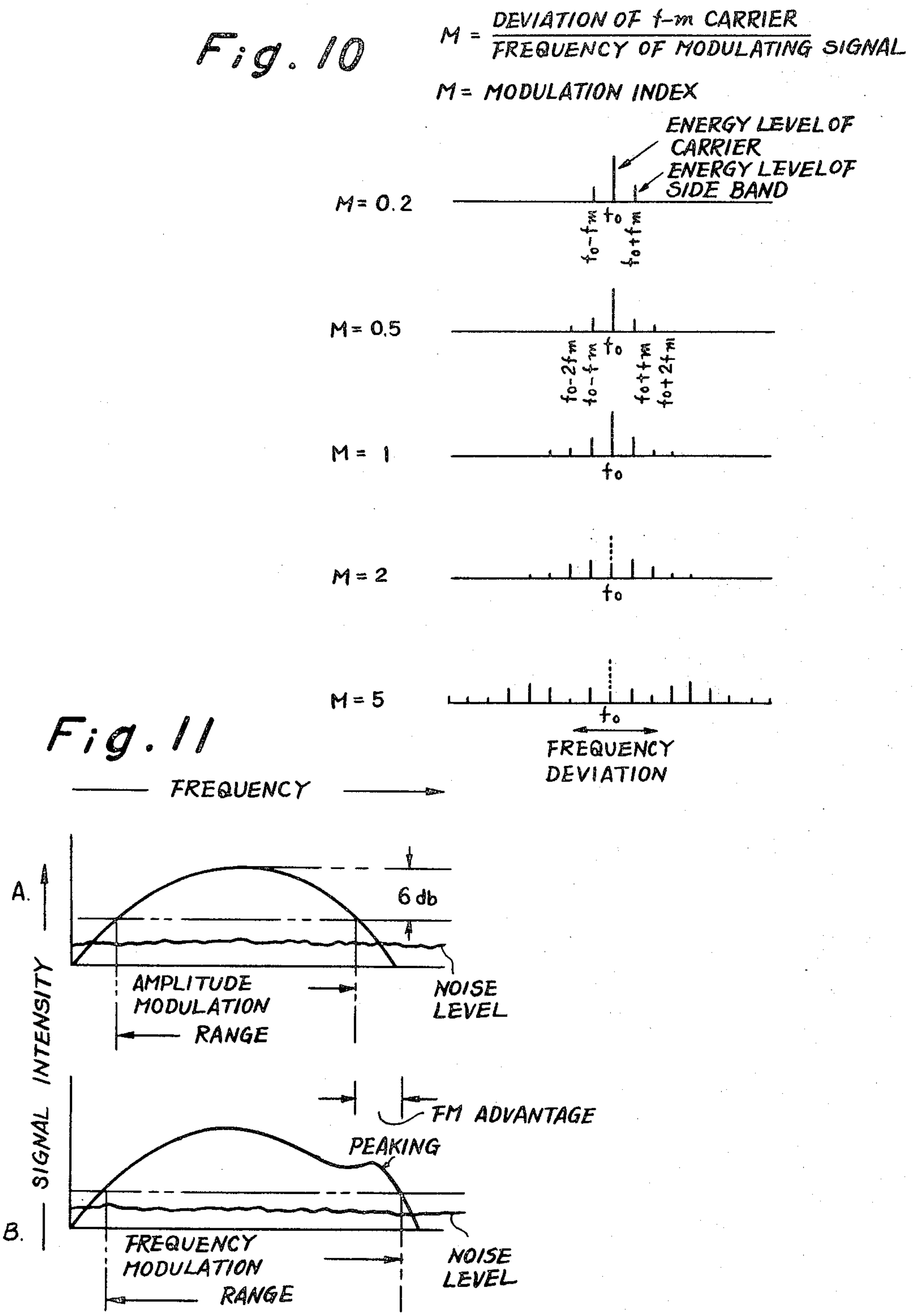
FIG. 10 is a graph which explains how energy in an FM signal is distributed as a function of the modulation index.
FIG. 11 includes two curves which explain how the distribution of energy in the outer FM signal side bands improves the signal-to-noise ratio as compared with the ratio in AM signals.

An amplitude modulated wave contains a carrier and only two (upper and lower) side bands. However, a frequency modulated wave may contain a number of side band. This is shown in FIG. 10 where $f_0$ is the carrier frequency and $f_m$ is a modulating frequency. Each vertical line in FIG. 10 represents the energy level of the carrier and of some component in the side band. The horizontal distance between the center vertical line and furthest removed vertical line varies as a function of the amplitude of the modulating frequency.

The five horizontal lines represent five values of modulation index of an FM wave, the index being identified by various modulation index (or "M") numbers. A "modulation index" or M number is defined as the deviation of the FM carrier divided by the frequency of the modulating signal.

One difference between AM and FM signals is that the carrier oscillator supplies additional energy to an AM wave. Therefore, higher amplitude modulating signals produce higher energy levels in AM signals. On the other hand, the oscillator does not add energy to an FM signal. The higher amplitude modulation signals produce only a wider redistribution of energy in the FM signals. As a result, relatively less energy is in the FM carrier and relatively more energy is in the side bands when the modulation index increases. Thus, by comparing the various graphs in FIG. 10, it is seen that most energy is in the carrier $f_0$ when the modulation index is low, as at 0.2. However, when the index reaches 2 or higher, some side bands contain much more energy than the carrier contains. By comparing the energy distrubution where the index is 2 and 5, it is seen that the energy in the carrier approaches zero while the energy in the side bands peaks at high levels.

If the energy distributions of AM and FM signals are plotted with frequency on a horizontal axis and signal intensity on a vertical axis, the characteristic curves will be somewhat as shown in FIG. 11.

For an AM signal (FIG. 11A), the energy is distributed with a maximum in the center, near the carrier frequency. From this maximum energy level, the energy level falls off fairly uniformly toward the extremities of the side bands. This AM signal cannot be reproduced in its entirety because some low level of noise is almost certain to appear. Therefore, it is customary to limit the lower level of the reproduced signal at some discrete energy level, such as 3–6 db down from the peak level. The exact point of limiting depends upon the signal-to-noise level of the system. Thus, the curve of FIG. 11A has been drawn to include a section marked "Amplitude Modulation Range", which is the usable frequency band.

If a similar curve (FIG. 11B) is drawn from an FM signal, the energy does not fall off uniformly as the side bands produced by the modulating frequency departs from the carrier frequency. As shown in FIG. 10, the energy is redistributed into the side bands. Therefore, there is a peaking of energy at some point other than the carrier frequency. This means that, if the lower level limiting is at the same point of 3–6 db down from the maximum signal intensity, the FM range enjoys an advantage with no loss of signal-to-noise ratio. FIG. 11 indicates the extended range by the notation "FM advantage".

Figure 3:
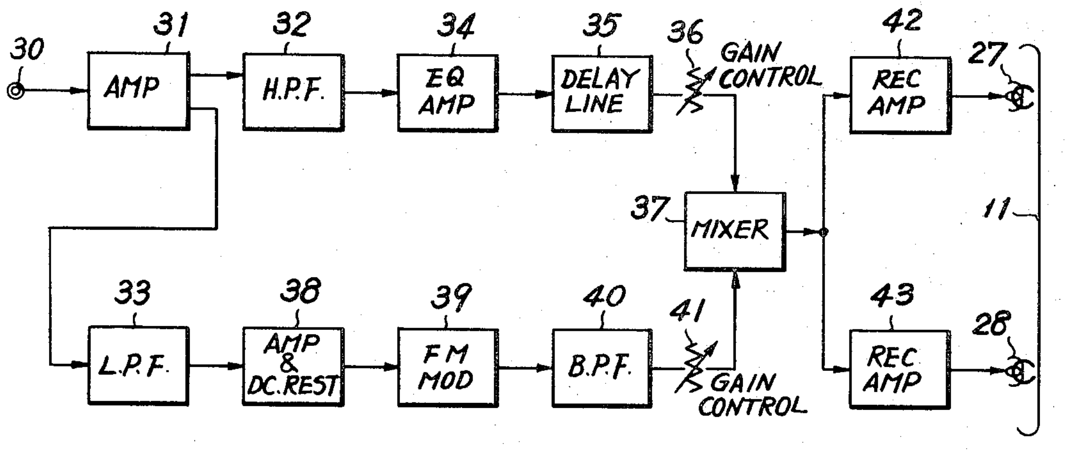
FIG. 3 is a block diagram of one embodiment of the recording system embodying the present invention.
Figure 4:
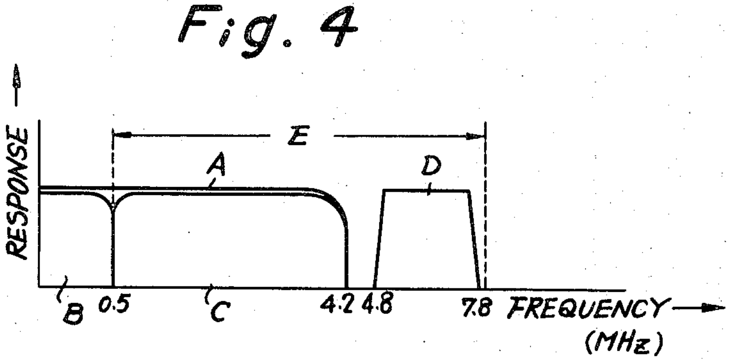
FIG. 4 is a frequency versus response curve giving an explanation of the principles of the present invention.

With the foregoing information in mind, the invention should be appreciated more fully when one realizes that the most prominent source of noise in the inventive system is the cross talk between the two channels, as shown in FIG. 3. If the signal-to-noise ratio were relatively bad, as it is in the AM curve, the cross talk between signals separated by filters 32, 33 would be relatively severe. This would be an ultimate limit imposing severe restrictions on the system designer. On the other hand, if the signal-to-noise ratio is relatively good, as it is in the FM curve, the system designer has a much greater latitude.

One embodiment of the reproducing system embodying the present invention will now be explained with reference to FIG. 5. The intermittent signals reproduced from the magnetic tape 11 by the magnetic heads 27 and 28, acting alternately, are amplified by reproducing amplifiers 45 and 46, respectively. Their signal levels are aligned with each other by equalization amplifiers 47 and 48. Then, the signal levels have their gains adjusted by gain controls 49 and 50, and then they are transmitted to a mixer 51. The output of the mixer 51 is a continuous signal.

The output of the mixer is supplied to both a low-pass filter 52 and a high-pass filter 53. The cut-off frequencies of the low-pass filter 52 and the high-pass filter 53 are determined by the lower frequency limit of the deviated carrier wave and the highest frequency of the high frequency band component (C). They are selected so that it is possible to separate the high frequency band component (C) and the low frequency band component (D). In the embodiment shown in FIG. 5, the cut-off frequency of the low-pass filter 52 is 4.2 MHz while that of the high-pass filter 53 is 4.8 MHz.

The high frequency band component (C) passed by the low-pass filter 52 is amplified by an equalization amplifier 54. Next, it is passed through a delay line 55 to delay the high frequency band component and remove a discrepancy in time between the high and low frequency band components. Then, the high frequency band component is supplied to a gain control 56. On the other hand, the frequency modulated carrier wave (D) passed by the high-pass filter 53 is amplified to a constant amplitude by an equalization amplifier 57 and applied to a limiter 58. The frequency modulated carrier wave is removed its unnecessary amplitude variations and then applied to a demodulator 59. The original low frequency band component (B) demodulated by the demodulator 59 is taken out. The low frequency band component (B) is transmitted to a mixer 62 after being passed through a low-pass filter 60 and a gain control 61.

The high frequency band component (C) is transmitted from the gain control 56 and the low frequency band component (B) transmitted from the gain control 61 are mixed at the mixer 62. The output of mixer 62 is the original video signal which is amplified by an output amplifier 63 and then taken out through an output terminal 64.

Figure 6:
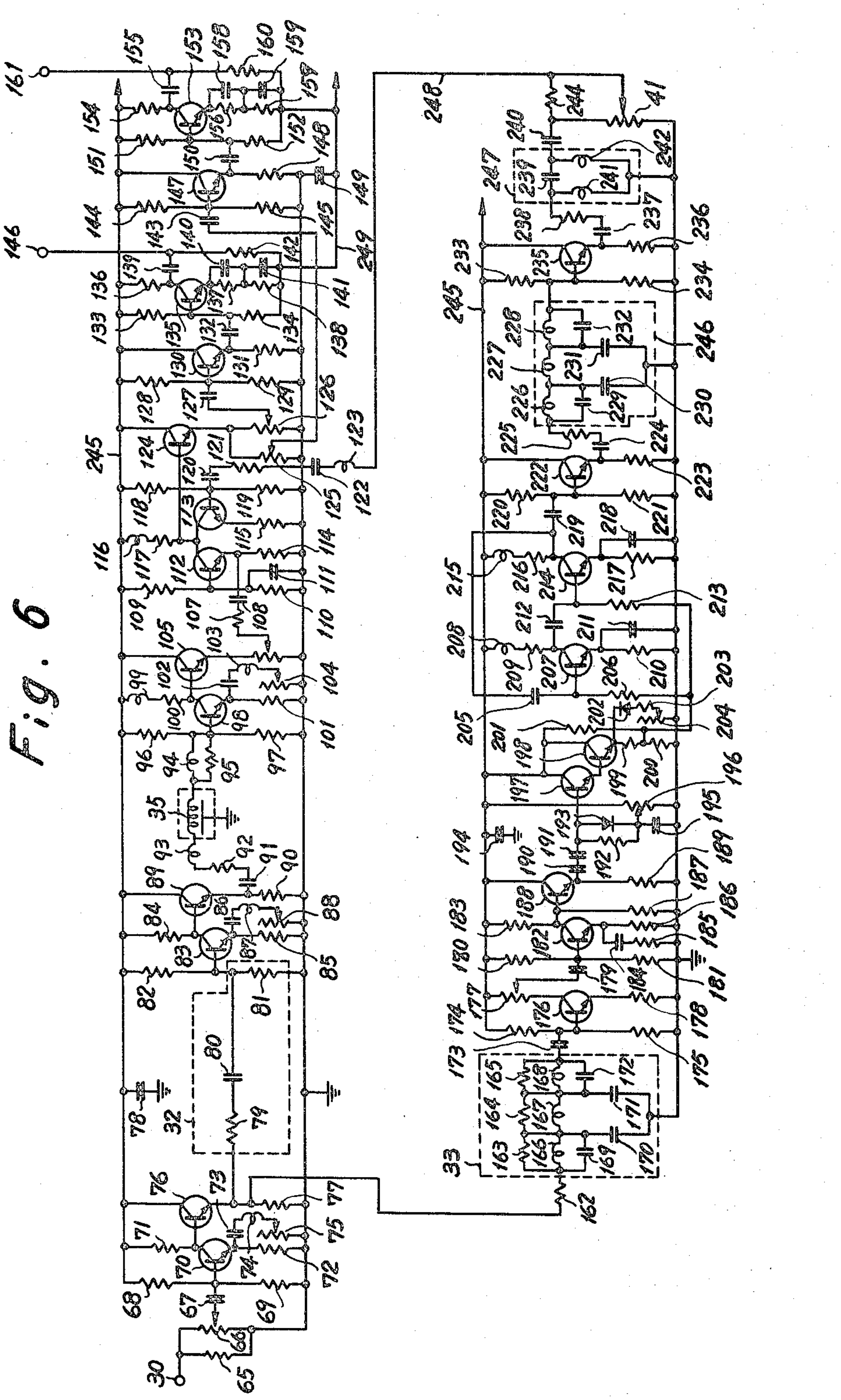
FIG. 6 is a circuit diagram of the embodiment made into a concrete form along the lines of the block diagram of FIG. 3.

One embodiment of the circuit diagram of the recording system embodying the present invention (as shown in the block diagram of FIG. 3) will now be explained with reference to FIG. 6. In FIG. 6, the equalization amplifier 34 of FIG. 3 is divided into a plurality of sections which are arranged before and after the delay line from the point of view of design. The band-pass filter 40 of FIG. 3 consists of a low-pass filter 246 and a high-pass filter 247.

A video signal supplied through the input terminal 30 is passed through a variable resistor 66 and a capacitor 67 to the base of a transistor 70. A circuit made up of transistors 70 and 76 forms an amplifier. A series circuit connected to the emitter of the transistor 70 and made up of a capacitor 73, a coil 74 and a resistor 75, has a frequency related circuit constant. The circuit is resonate at a frequency of 3.6 MHz owing to the action of the capacitor 73 and the coil 74. Therefore, the output video signal appearing in the emitter of the transistor 76 has a higher frequency component, which is boosted.

On the other hand, the output signal has its high frequency band component passed through the high-pass filter 52. The filter 32 comprises a resistor 79, a capacitor 80 and a resistor 81. The circuit values cause a cut-off frequency of 0.5 MHz. The output of the filter is applied to the base of a transistor 83. A circuit made up of transistors 83 and 89 forms an amplifier. A series circuit connected to the emitter of the transistor 83 comprising a capacitor 86, a coil 87 and a variable resistor 88 has a circuit constant which is selected to resonate at 1.5 MHz. Therefore, the output video signal appearing in the emitter of the transistor 89 has an intermediate frequency component which is boosted. The intermediate frequency is boosted by a degree which may be controlled by adjusting the resistance value of the variable resistor 88. The output signal is passed through a capacitor 91, a resistor 92, and a coil 93 to the delay line 35, with a delay time of 1.0 $\mu$ sec. The signal delayed by 1.0 $\mu$ sec. by the delay line 35 is passed through a parallel circuit made up of a coil 94 and a resistor 95, and then it is applied to the base of a transistor 98.

A circuit made up of transistors 98 and 105 forms an amplifier. A series circuit connected to the emitter of the transistor 98 and made up of a capacitor 102, a coil 103 and a variable resistor 104 has a circuit constant which is resonate at a frequency of 0.5 MHz. Therefore, the output video signal appearing in the emitter of a transistor 105 has a boosted lower frequency component. The degree at which the lower frequency component is boosted can be controlled by adjusting the resistance value of the variable resistor 104.

The high frequency band component appearing in the emitter of the transistor 105 has its gain adjusted by the variable tap of a variable resistor making up the gain control 36. This frequency band is passed through a resistor 107 and a capacitor 108 before being applied to the emitter of a transistor 112.

On the other hand, the output signal appearing in the emitter of the transistor 76 is passed through a resistor 162. It has a low frequency band component (B) taken out by the low-pass filter 33 made up of resistors 163, 164, 165, coils 166, 167, 168, and capacitors 169, 170, 171, 172. The cut-off frequency of filter 33 is 0.5 MHz. The resulting signal is applied to the base of a transistor 176 after being passed through a capacitor 173. The low frequency band component (B) is amplified by an amplifier circuit including a transistor 176. The amplified low frequency band component has its signal voltage adjusted by a variable resistor 177 connected between the collector of the transistor 176 and +12 volt line 245. The low frequency band component is passed through the variable tap of the variable resistor 177 and a capacitor 179 before being applied to the base of a transistor 182.

A circuit made up of transistors 182 and 188 is an amplifier circuit. The amplified low frequency band component appearing in the emitter of the transistor 188 is passed through capacitors 190 and 191 to the base of a transistor 197. This transistor is connected to one end of a parallel circuit made up of a diode 193 and a resistor 192. The other end of the parallel circuit is connected through a capacitor 195 to a line leading to ground. This same end is also connected to the variable tap of a variable resistor 196 connected between the + 12 volt line 245 and the ground line. The parallel circuit is a DC component restoring circuit. The low frequency band component has its DC component restored by clamping the potential of the base of the transistor 197 at the potential of the variable tap of the variable resistor 196. The potential of the base of the transistor is clamped by the leading edge of a horizontal synchronizing signal contained in the low frequency band component.

A circuit including transistors 197 and 198 is a white level clipper. When the potential of the emitter of the transistor 198 is negative relative to the white level of the low frequency band component, a current flows to a series circuit connected between the emitter of the transistor 198 and a ground line. This series circuit is made up of a diode 202, a resistor 203 and a variable resistor 204. This effectively reduces the impedance of the series circuit connected in shunt to the first mentioned series circuit. Thus, the voltage gain of the signal which is negative relative to the white level portion is reduced, thereby clipping the portion.

A circuit made up of transistors 207 and 214 forms an oscillator of the multivibrator type. The junction point between resistors 199 and 200 is connected via a resistor 206 to the base of the transistor 207, and through a resistor 213 to the base of the transistor 214. The oscillation frequency of this multivibrator is controlled by the potential on the line connected to the function of the resistors 199 and 200. Thus, it is frequency modulated by the output voltage of the low frequency band component transmitted from the white level clipper formed by the transistors 197, 198.

The frequency modulated carrier wave appearing in the collector of a transistor 214 is passed through a capacitor 219 to the base of a transistor 222 of an emitter-follower circuit. The output signal appearing in the emitter of the transistor 222 is passed through a capacitor 224 and a resistor 225 to a low-pass filter 246. This filter is made up of coils 226, 227, 228 and capacitors 229, 230, 231, 232 and designed to have a cut-off frequency of 7.8 MHz. The frequency modulated carrier wave passed by the low-pass filter 246 is applied to the base of a transistor 235 of an emitter-follower circuit. The output signal appearing in the emitter of the transistor 235 is passed through a capacitor 237 and a resistor 238 to a high-pass filter 247. This filter is made up of a capacitor 239 and coils 241, 242 and designed to have a cut-off frequency of 4.8 MHz.

The frequency modulated carrier wave passed by the high-pass filter 247 is passed through a capacitor 240 and applied to one end of a variable resistor constituting the gain control 41. This resistor is grounded at the other end. After its gain is adjusted by a setting of the variable tap of the variable resistor, the modulated carrier is passed through a coil 123, a capacitor 122, a resistor 121, and a capacitor 120, to the base of a transistor 113.

As aforementioned, the band-pass filter 40 (shown in FIG. 3) is replaced by the low-pass filter 246 and the high-pass filter 247, in the present embodiment. This is done to facilitate the design of the filter.

A circuit including transistors 112 and 113 is a mixer circuit. The high frequency band component (C) is applied to the emitter of the transistor 112 and the modulated carrier (D) is applied to the base of the transistor 113. As a result, these two signals are mixed to produce the signal (E) (see FIG. 4) which appears in the common circuit at the collectors of transistors 112 and 113, connected to the base of a transistor 124 of an emitter-follower stage. Variable resistors 125 and 126 control the recording level. They are connected in shunt between the emitter of the transistor 124 and ground.

The signal (E) has its recording level adjusted by the variable resistor 126. This signal is amplified by an amplifier circuit including transistors 130 and 135 and then it is fed to a terminal 146. This signal is applied through the terminal 146 to the magnetic head 27 and recorded on the magnetic tape 11. On the other hand, the signal (E), having its recording level adjusted by the variable resistor 125, is amplified by an amplifier circuit including transistors 147 and 153. Thereafter, the signal is fed to a terminal 161. This signal is applied through the terminal 161 to the magnetic head 28 and recorded on the magnetic tape 11. A DC voltage of −12 volts is applied to a line 249.

One embodiment of the circuit diagram of the reproducing system (FIG. 5) will now be explained with reference to FIG. 7. In the reproducing system embodying this invention, means are provided for separately selecting the high frequency band component (C) in which the amplitude of a video signal is varied and the frequency modulated carrier wave (D) in which the frequency of a video signal is varied. These two signal components are mixed and the frequency modulated carrier wave (D) is demodulated so that the low frequency band component (B) may be taken out. This makes it necessary to keep a constant amplitude of the frequency modulated carrier wave before it is demodulated. For this reason, a large number of amplitude limiter stages are provided.

An intermittent signal reproduced from the magnetic tape 11 by means of the magnetic head 27 is passed through a capacitor 250 to the base of a transistor 256. There, the signal is amplified by a reproducing amplifier circuit including transistors 256, 257 and 265. The amplified signal is passed through the variable tap of a variable resistor 266 which is connected between the emitter of the transistor 265 and ground. The signal is applied to the base electrode of an equalization amplifier including transistors 274 and 277. Gain is adjusted by the variable tap of the variable gain control resistor 49 connected between the emitter of the transistor 277 and ground. The signal is passed through a resistor 278, a capacitor 279, and the base of a transistor 282.

An intermittent signal reproduced from the magnetic tape 11 by means of the magnetic head 28 is passed through a capacitor 367 and applied to the base of a transistor 373. Here the signal is amplified by a reproducing amplifier circuit made up of transistors 373, 374 and 381. The amplified signal is passed through the variable tap of a variable resistor 383, connected between the emitter of the transistor 381 and ground. The signal is applied to the base of a transistor 389 to be amplified by an equalization amplifier made up of transistors 389 and 396. After having its gain adjusted by the variable tap of the variable gain control resistor 50, the signal is passed through a resistor 397 and a capacitor 391, to the base of a transistor 283.

Transistors 282 and 283 form a mixer circuit. The intermittent signal reproduced by the magnetic head 27 and applied to the base of the transistor 282 and the intermittent signal reproduced by the magnetic head 28 and applied to the base of the transistor 283 are mixed in the mixer circuit. A continuous signal appearing in the common junction of collectors of the transistors 282 and 283 is applied to the base of a transistor 292 of an emitter-follower.

A continuous signal appearing in the emitter of the transistor 292 is passed, through a capacitor 294 and a resistor 296 to the low-pass filter 52 having a cut-off frequency of 4.2 MHz. This filter is made up of coils 297, 298, 299 and capacitors 300, 301, 302, 303. The signal passed by this low-pass filter 52 is the high frequency band component (C) shown in FIG. 4. This component is applied to the base of a transistor 306. A circuit made up of transistors 306 and 312 is an amplifier circuit. A series circuit connected to the emitter of the transistor 306 is made up of a capacitor 309, a coil 310, and a variable resistor 311. The circuit values of this are selected so that the circuit is resonate at a frequency of 3.5 MHz, by the actions of the capacitor 309 and the coil 310. Accordingly, the high frequency band component (C) appearing in the emitter of the transistor 312 has a boosted high frequency component.

This output signal is passed through a capacitor 314, a resistor 410 and a coil 315, and the delay line 55 having a delay time of 1.0 $\mu$ sec. The signal delayed by 1.0 $\mu$ sec. by the delay line 55 is passed through a parallel circuit of a coil 318 and a resistor 319, and applied to the base of a transistor 322.

An amplifier circuit is made up of transistors 322 and 330. A series circuit connected to the emitter of the transistor 322 comprises a capacitor 327, a coil 328 and a variable resistor 329. This circuit has a constant selected to resonate at a frequency of 0.5 MHz, by the actions of the capacitor 327 and the coil 328. Accordingly, the high frequency band component (C) appearing in the emitter of a transistor 330 has a boosted lower frequency component. After having its gain adjusted by the variable tap of the gain control resistor 56, the signal of the high frequency band component (C) is passed through a resistor 331 and a capacitor 332, to the base of a transistor 335.

On the other hand, continuous output signal appearing in the emitter of the transistor 292 is passed through a capacitor 295 and a resistor 398. The signal is applied to the low-pass filter 53 having a cut-off frequency of 4.5 MHz. This filter is made up of resistors, 400, 401, 402, capacitors 403, 404, 405 and coils 406, 407, 408, 409. The modulated carrier (D) output of this filter is passed through a capacitor 510 and applied to the base of a transistor 513.

There are four amplifier circuits made up of transistors 513 and 517, transistors 532 and 538, transistors 550 and 555, transistors 567 and 572, and transistors 559 and 602. There are five amplitude limiter circuits made up of diodes, 525, 526 and resistors 523, 527, 528, diodes 542, 544 and resistors 543, 541, 545, diodes 559, 560 and resistors 561, 558, 562, diodes 576, 578 and resistors 577, 575, 579, and a resistor 593 and transistors 595 and 596. The transistor combinations 595, 596 have collectors and bases connected in common to act as diodes.

The modulated carrier (D) is passed successively and alternately through these amplifier circuits and amplitude limiter circuits, through the emitter of a transistor 602, a capacitor 604, and a resistor 605, to the base of a transistor 609.

The base of the transistor 609 is connected to the +12 volt line 245 through a resistor 411, and to ground through a resistor 608, a series circuit including a capacitor 606 and a coil 607.

The collector of the transistor 609 is connected through a resistor 610 to the +12 volt line 245. Connected to said collector is one end of a capacitor 611. The other end of this capacitor is connected through a resistor 613 to ground and also to the cathode of a diode 612.

The emitter of the transistor 609 is connected to ground through a resistor 614. Connected to the emitter is one end of a capacitor 615. The other end is connected to ground through a resistor 616 and also to the cathode of a diode 617. The cathodes of the diodes 612 and 617 are connected to each other through a variable resistor 618.

A series circuit made up of the capacitor 606 and the coil 607 is connected between the base of the transistor 609 and ground. This circuit has a constant selected to resonate at a frequency of about 8 MHz. The signal voltage of the frequency modulated carrier wave (D) of constant amplitude is supplied by the transistor 602 through the capacitor 604. The signal is divided by the impedance of a parallel circuit made up of the resistor 605 and a series impedance of the resistors 608, 411, capacitor 606 and coil 607. The resultant signal is applied to the base of the transistor 609. The impedance of the parallel circuit is made to vary by the series resonance circuit of the coil 607 and capacitor 606 together with the frequency of the modulated carrier (D).

Accordingly, as the carrier wave is deviated to a higher frequency side, the impedance of the series resonance circuit is reduced; as the carrier wave is deviated to a lower frequency side, the impedance is increased. Therefore, the frequency modulated carrier wave (D) is converted into an amplitude modulated carrier wave and applied to the base of the transistor 609. An amplitude modulated carrier wave appearing in the collector and emitter of the transistor 609 is detected by the diodes 612 and 617. Thus, the low frequency band component of the video signal is taken out from the variable tap of the variable resistor 618.

The signal of this low frequency band component is passed through a capacitor 619 to the base of an amplifying transistor 626. The signal is also amplified at a transistor 629 and passed through the emitter of the transistor 629, a capacitor 631 and a resistor 632 to the low-pass filter 60. The filter 60 has a cut-off frequency of 0.6 MHz.

The low frequency band component of the video signal is passed by the low-pass filter 60 and converted into the original low frequency band component (B). The signal is then applied to the base of a transistor 638 which is part of an amplifier made up of transistors 638 and 641. The amplified component has its gain adjusted by the variable tap of the gain control resistor 61 connected between the emitter of the transistor 641 and ground. The output is passed through a resistor 642 and capacitors 643 and 344 to the base of a transistor 339.

A mixer circuit is made up of transistors 335 and 339. The original high frequency band component (C) of the video signal applied to the base of the transistor 335 and the original low frequency band component (B) of the same video signal applied to the base of the transistor 339 are mixed. The original video signal appearing in the common connected collectors of the transistors 335 and 339 is passed through the variable tap of a variable resistor 338 connected between the collectors and the +12 volt line 245. Resistor 338 adjusts the signal level of said video signal. A coupling capacitor 343 applies the signal to the base of a transistor 347 of an amplifier made up of transistors 347 and 354. After being amplified, the original video signal is transmitted from the emitter of the transistor 354 to the bases of transistors 356 and 357, two emitter-follower stages. The signal passed from the emitters of the transistors 356 and 357 through resistors 361 and 365 appears at the terminal 64 and an auxiliary terminal 366. The original video signal is taken out at this point.

The component parts of circuits used in the circuits of FIGS. 6 and 7 have constants which are as follows:

RESISTORS

| | | | |
|---|---|---|---|
| **65** | 82Ω | **68** | 27KΩ |
| **69** | 4.7 KΩ | **71** | 1.8KΩ |
| **72** | 560Ω | **77** | 1.2KΩ |
| **79** | 1KΩ | **81** | 1.2KΩ |
| **82** | 6.8KΩ | **84** | 1.8KΩ |
| **85** | 560Ω | **90** | 1.2KΩ |
| **92** | 2.2KΩ | **95** | 10KΩ |
| **96** | 15KΩ | **97** | 2.7KΩ |
| **100** | 1.8KΩ | **101** | 560Ω |
| **107** | 1KΩ | **109** | 39KΩ |
| **110** | 4.7KΩ | **114** | 330Ω |
| **115** | 330Ω | **117** | 1.8KΩ |
| **118** | 39KΩ | **119** | 4.7KΩ |
| **121** | 1KΩ | **128** | 22KΩ |
| **129** | 22KΩ | **131** | 680Ω |
| **133** | 3.9KΩ | **134** | 1KΩ |
| **136** | 220Ω | **137** | 10Ω |
| **138** | 47Ω | **142** | 220Ω |
| **144** | 22KΩ | **145** | 22KΩ |
| **148** | 680Ω | **151** | 3.9KΩ |
| **152** | 1KΩ | **154** | 220Ω |
| **156** | 10Ω | **157** | 47Ω |
| **160** | 220Ω | **162** | 1KΩ |
| **163** | 3.9KΩ | **164** | 8.2KΩ |
| **165** | 3.9KΩ | **174** | 6.8KΩ |
| **175** | 1.2KΩ | **178** | 470Ω |
| **180** | 47KΩ | **181** | 5.6KΩ |
| **183** | 2.7KΩ | **185** | 68Ω |
| **186** | 330Ω | **187** | 1.8KΩ |
| **189** | 1.2KΩ | **192** | 1MΩ |
| **199** | 1.8KΩ | **200** | 470Ω |
| **201** | 820Ω | **203** | 680Ω |
| **206** | 560Ω | **209** | 560Ω |
| **210** | 820Ω | **213** | 560Ω |
| **216** | 560Ω | **217** | 820Ω |
| **220** | 33KΩ | **221** | 33KΩ |
| **223** | 1.2KΩ | **225** | 1KΩ |
| **233** | 2.2KΩ | **234** | 1.8KΩ |
| **236** | 1.2KΩ | **238** | 1KΩ |
| **244** | 2.2KΩ | **251** | 6.8KΩ |
| **253** | 8.2KΩ | **254** | 1.5KΩ |
| **259** | 3.3KΩ | **260** | 1KΩ |
| **262** | 15KΩ | **263** | 15KΩ |
| **269** | 27KΩ | **270** | 3.9KΩ |
| **271** | 330Ω | **273** | 2.2KΩ |
| **275** | 270Ω | **278** | 1KΩ |
| **280** | 39KΩ | **281** | 2.7KΩ |
| **284** | 330Ω | **287** | 1.8KΩ |
| **289** | 39KΩ | **290** | 4.7KΩ |
| **293** | 1.2KΩ | **296** | 1KΩ |
| **304** | 6.8KΩ | **305** | 1.2KΩ |
| **307** | 1.8KΩ | **308** | 560Ω |
| **313** | 1.2KΩ | **319** | 12 KΩ |
| **320** | 15KΩ | **321** | 2.7KΩ |
| **324** | 1.8KΩ | **325** | 2.2KΩ |
| **326** | 560Ω | **331** | 1KΩ |
| **333** | 47KΩ | **334** | 4.7KΩ |
| **336** | 330Ω | **340** | 330Ω |
| **341** | 4.7KΩ | **342** | 47KΩ |
| **345** | 27KΩ | **346** | 6.8KΩ |
| **348** | 1KΩ | **349** | 470Ω |
| **352** | 22KΩ | **353** | 22KΩ |
| **355** | 1.2KΩ | **358** | 120Ω |
| **360** | 1.5KΩ | **361** | 68Ω |
| **362** | 120Ω | **364** | 1.5KΩ |
| **365** | 68Ω | **368** | 6.8KΩ |
| **370** | 8.2KΩ | **371** | 1.5KΩ |
| **376** | 3.3KΩ | **377** | 1KΩ |
| **379** | 15KΩ | **380** | 15KΩ |
| **384** | 1KΩ | **386** | 27KΩ |
| **388** | 3.9KΩ | **390** | 330Ω |
| **392** | 2.2KΩ | **394** | 270Ω |
| **397** | 1KΩ | **398** | 1KΩ |
| **400** | 12KΩ | **401** | 27KΩ |
| **402** | 12KΩ | **410** | 2.2KΩ |
| **411** | 22KΩ | **413** | 330Ω |
| **511** | 5.6KΩ | **512** | 1.2KΩ |
| **514** | 330Ω | **515** | 5.6KΩ |
| **516** | 1KΩ | **521** | 1.8KΩ |
| **523** | 22KΩ | **527** | 8.2KΩ |
| **528** | 8.2KΩ | **530** | 8.2KΩ |
| **531** | 4.7KΩ | **534** | 6.8KΩ |

| | | | |
|---|---|---|---|
| 536 | 1.2KΩ | 537 | 1KΩ |
| 539 | 1.8KΩ | 541 | 8.2KΩ |
| 543 | 22KΩ | 545 | 8.2KΩ |
| 547 | 8.2KΩ | 548 | 4.7KΩ |
| 551 | 5.6KΩ | 553 | 1.2KΩ |
| 554 | 1KΩ | 556 | 1.8KΩ |
| 558 | 8.2KΩ | 561 | 22KΩ |
| 562 | 8.2KΩ | 564 | 8.2KΩ |
| 565 | 4.7KΩ | 568 | 5.6KΩ |
| 570 | 1.2KΩ | 571 | 1KΩ |
| 573 | 1.8KΩ | 575 | 8.2KΩ |
| 577 | 22KΩ | 579 | 8.2KΩ |
| 581 | 8.2KΩ | 582 | 4.7KΩ |
| 585 | 1KΩ | 586 | 5.6KΩ |
| 588 | 1.2KΩ | 591 | 1.8KΩ |
| 593 | 1KΩ | 597 | 33KΩ |
| 598 | 8.2KΩ | 600 | 1.8KΩ |
| 601 | 470Ω | 603 | 1.8KΩ |
| 605 | 1.5KΩ | 608 | 10KΩ |
| 610 | 470Ω | 613 | 1KΩ |
| 614 | 470Ω | 616 | 1KΩ |
| 620 | 1.8KΩ | 622 | 1.2KΩ |
| 623 | 39KΩ | 624 | 6.8KΩ |
| 627 | 2.2KΩ | 628 | 470Ω |
| 630 | 1.5KΩ | 632 | 1KΩ |
| 636 | 6.8KΩ | 637 | 1.2KΩ |
| 639 | 2.2KΩ | 640 | 560Ω |
| 642 | 1KΩ | | |

VARIABLE RESISTORS

| | | | |
|---|---|---|---|
| 36 | 2KΩ | 41 | 1KΩ |
| 49 | 2KΩ | 50 | 2KΩ |
| 56 | 2KΩ | 61 | 2KΩ |
| 66 | 1KΩ | 75 | 2KΩ |
| 88 | 2KΩ | 104 | 2KΩ |
| 125 | 2KΩ | 126 | 2KΩ |
| 177 | 2KΩ | 196 | 5KΩ |
| 204 | 2KΩ | 266 | 2KΩ |
| 276 | 5KΩ | 311 | 2KΩ |
| 329 | 2KΩ | 338 | 2KΩ |
| 383 | 2KΩ | 393 | 5KΩ |
| 520 | 2KΩ | 618 | 1KΩ |

CAPACITORS

| | | | |
|---|---|---|---|
| 67 | 30μF | 73 | 120pF |
| 78 | 100μF | 80 | 256pF |
| 86 | 470pF | 91 | 0.01μF |
| 102 | 0.0033μF | 108 | 0.033μF |
| 111 | 5μF | 120 | 0.01μF |
| 122 | 20pF | 127 | 0.01μF |
| 132 | 0.022μF | 139 | 0.1μF |
| 140 | 0.001μF | 141 | 30μF |
| 143 | 0.01μF | 149 | 100μF |
| 150 | 0.022μF | 155 | 0.1μF |
| 158 | 0.001μF | 159 | 30μF |
| 169 | 215pF | 170 | 320pF |
| 171 | 320pF | 172 | 215pF |
| 173 | 50μF | 179 | 50μF |
| 184 | 0.0033μF | 190 | 3μF |
| 191 | 3μF | 194 | 100μF |
| 195 | 30μF | 205 | 20pF |
| 211 | 30μF | 212 | 20pF |
| 218 | 30μF | 219 | 0.01μF |
| 224 | 0.01μF | 229 | 15pF |
| 230 | 25pF | 231 | 25pF |
| 232 | 17pF | 237 | 0.01μF |
| 239 | 15PF | 240 | 0.01μF |
| 250 | 0.01μF | 252 | 0.15μF |
| 255 | 0.033μF | 261 | 0.01μF |
| 264 | 0.01μF | 267 | 0.022μF |
| 268 | 0.15μF | 279 | 0.022μF |
| 285 | 47pF | 288 | 47pF |
| 291 | 0.022μF | 294 | 0.022μF |
| 295 | 0.01μF | 300 | 39pF |
| 301 | 71pF | 302 | 61pF |
| 303 | 49pF | 309 | 39pF |
| 314 | 0.01μF | 316 | 100μF |
| 327 | 0.0033μF | 332 | 0.01μF |
| 337 | 68pF | 343 | 50μF |
| 344 | 100μF | 350 | 56pF |
| 351 | 50μF | 359 | 200μF |
| 363 | 200μF | 367 | 0.01μF |
| 369 | 0.015μF | 372 | 0.033μF |
| 378 | 0.01μF | 382 | 0.01μF |
| 385 | 0.15μF | 387 | 0.022μF |
| 395 | 47pF | 399 | 100μF |
| 403 | 56pF | 404 | 20pF |
| 405 | 56pF | 412 | 47pF |
| 510 | 0.01μF | 518 | 25pF |
| 522 | 0.15μF | 524 | 0.001μF |
| 529 | 0.001μF | 533 | 0.001μF |
| 540 | 0.001μF | 546 | 0.001μF |
| 549 | 0.001μF | 557 | 0.001μF |
| 563 | 0.001μF | 566 | 0.001μF |
| 574 | 0.001μF | 580 | 0.001μF |
| 583 | 0.001μF | 590 | 100μF |
| 592 | 0.001μF | 594 | 0.001μF |
| 604 | 0.01μF | 606 | 25pF |
| 611 | 10μF | 615 | 10μF |
| 619 | 50μF | 621 | 470pF |
| 626 | 200pF | 631 | 100μF |
| 634 | 302pF | 635 | 302pF |
| 643 | 100μF | | |

INDUCTORS

| | | | |
|---|---|---|---|
| 74 | 12μH | 87 | 18μH |
| 93 | 33μH | 94 | 82μH |
| 99 | 47μH | 103 | 22μH |
| 116 | 12μH | 123 | 10μH |
| 166 | 120μH | 167 | 400μH |
| 168 | 120μH | 208 | 2.2μH |
| 215 | 2.2μH | 226 | 9μH |
| 227 | 32μH | 228 | 9μH |
| 241 | 33μH | 242 | 33μH |
| 258 | 47μH | 272 | 68μH |
| 286 | 22μH | 297 | 22μH |
| 298 | 68μH | 299 | 22μH |
| 310 | 12μH | 315 | 33μH |
| 318 | 82μH | 323 | 39μH |
| 328 | 22μH | 375 | 47μH |
| 391 | 68μH | 406 | 33μH |
| 407 | 22μH | 408 | 22μH |
| 409 | 33μH | 414 | 82μH |
| 519 | 10μH | 535 | 82μH |
| 552 | 68μH | 569 | 68μH |
| 587 | 68μH | 607 | 18μH |
| 633 | 594μH | | |

TRANSISTORS

| | | | | | |
|---|---|---|---|---|---|
| 70 | 2SC460B | HITACHI | 76 | 2SC460B | HITACHI |
| 83 | | do | 89 | | do |
| 98 | | do | 105 | | do |
| 112 | | do | 113 | | do |
| 135 | 2SC298S | SONY | 147 | 2SC460B | HITACHI |
| 153 | 2SC298S | SONY | 176 | 2SC460B | HITACHI |
| 182 | 2SC460B | HITACHI | 188 | | do |
| 197 | | do | 198 | | do |
| 207 | | do | 214 | | do |
| 222 | | do | 235 | | do |
| 256 | | do | 257 | | do |
| 265 | | do | 274 | | do |
| 277 | | do | 282 | | do |
| 283 | | do | 292 | | do |
| 306 | | do | 312 | | do |
| 322 | | do | 330 | | do |
| 335 | | do | 339 | | do |
| 347 | | do | 354 | | do |
| 356 | 2SC150V | HITACHI | 357 | 2SC150V | HITACHI |
| 373 | 2SC460B | HITACHI | 374 | 2SC460B | HITACHI |
| 381 | | do | 389 | | do |
| 396 | | do | 513 | | do |
| 517 | | do | 532 | | do |
| 538 | | do | 550 | | do |
| 555 | | do | 567 | | do |
| 572 | | do | 584 | | do |
| 589 | | do | 595 | | do |
| 596 | | do | 599 | | do |
| 602 | | do | 609 | | do |
| 625 | | do | 629 | | do |
| 638 | | do | 641 | | do |

DIODES

| | | | |
|---|---|---|---|
| 193 | OA90 | 202 | SD17 |
| 525 | OA90 | 526 | OA90 |
| 542 | OA90 | 544 | OA90 |
| 559 | OA90 | 560 | OA90 |
| 576 | OA90 | 578 | OA90 |
| 612 | OA90 | 617 | OA90 |

It is to be understood that the present invention is not limited to the specific form of the above embodiments illustrated in the drawings. For example, a high-pass filter 32 is used in the embodiment shown in FIG. 3 and FIG. 6. However, it is possible to use equalization amplifiers to exclude a low frequency component from being recorded on a magnetic tape. Alternatively, if selected properly, the frequency response characteristics of the reproduction system may act as a low frequency filter. This system includes magnetic heads 27 and 28, reproducing amplifiers 45 and 46, and equalization amplifiers 47 and 48 (see FIG. 5). It is possible to leave a recorded low frequency component unreproduced. It is thus possible to eliminate the high-pass filter 32.

Similarly, it is possible to eliminate a low-pass filter 33 in cases where a high frequency component can be excluded by properly selecting either the frequency response characteristics of a frequency modulator 39 or the frequency band which is passed by the band-pass filter 40.

Figure 5:
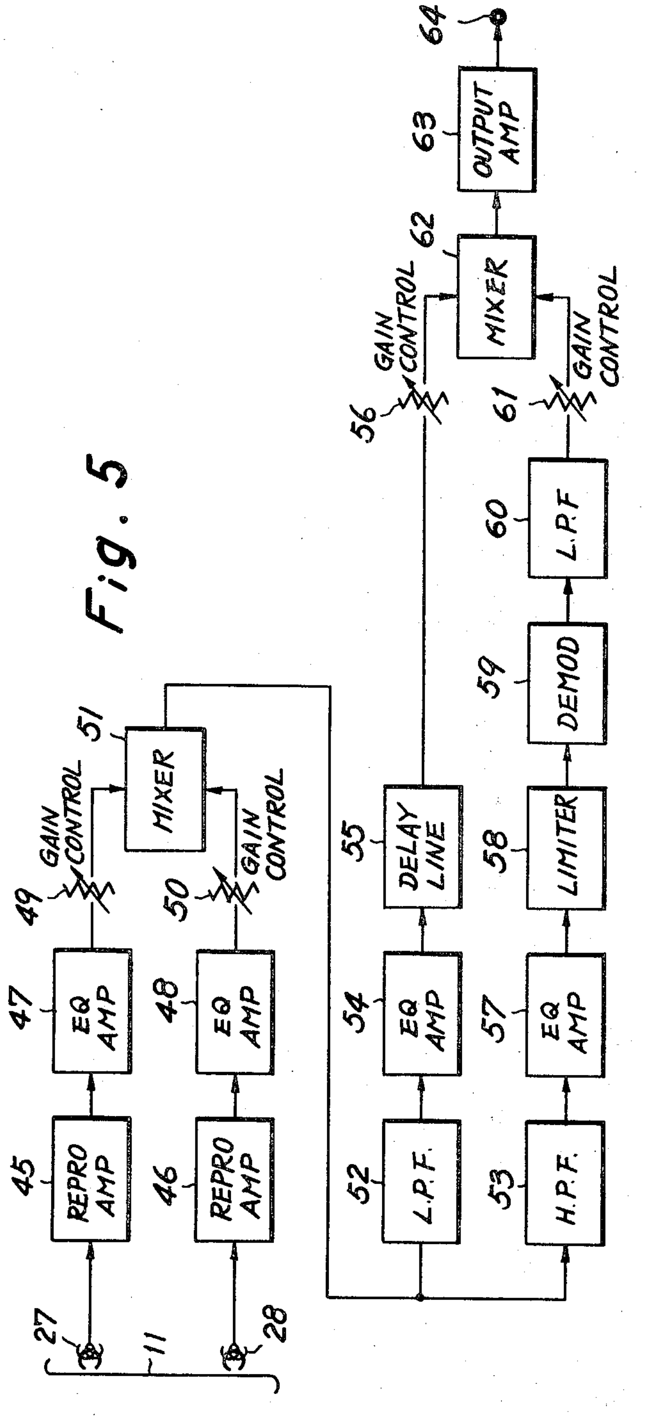
FIG. 5 is a block diagram of one embodiment of the reproducing system embodying the present invention.
Figure 7:
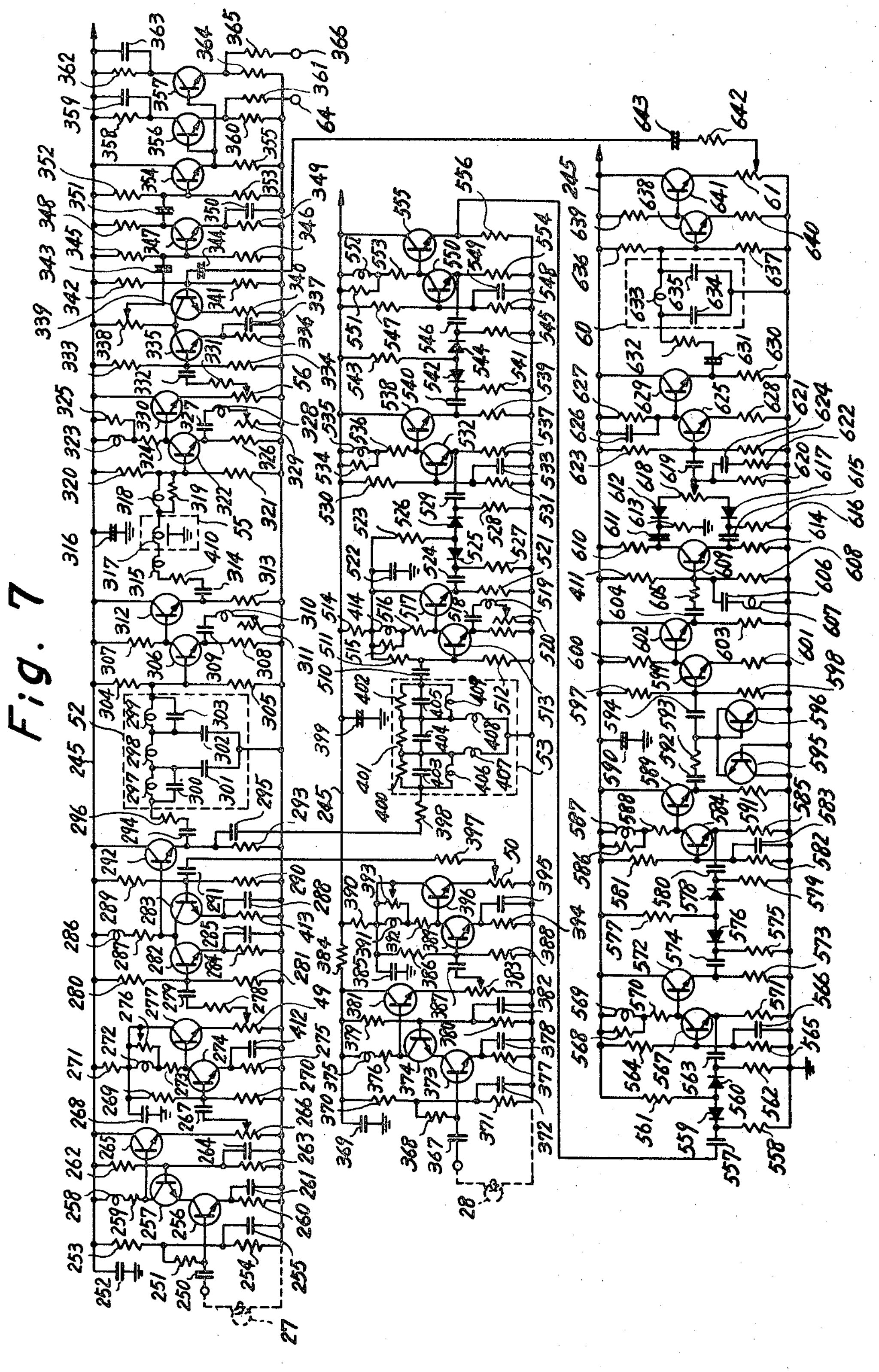
FIG. 7 is a circuit diagram of the embodiment made into a concrete form along the lines of the block diagram of FIG. 5.

In the embodiment shown in FIG. 5 and FIG. 7, the unnecessary low frequency component could be suppressed by amplitude limiters. These low frequency components might exist in the signal processed by the component parts of the system following the high-pass filter 53. Even if these components were demodulated, they could be excluded because they are outside the frequency band that is passed by a low-pass filter. It is thus possible to eliminate the high-pass filter 53.

Figure 8:
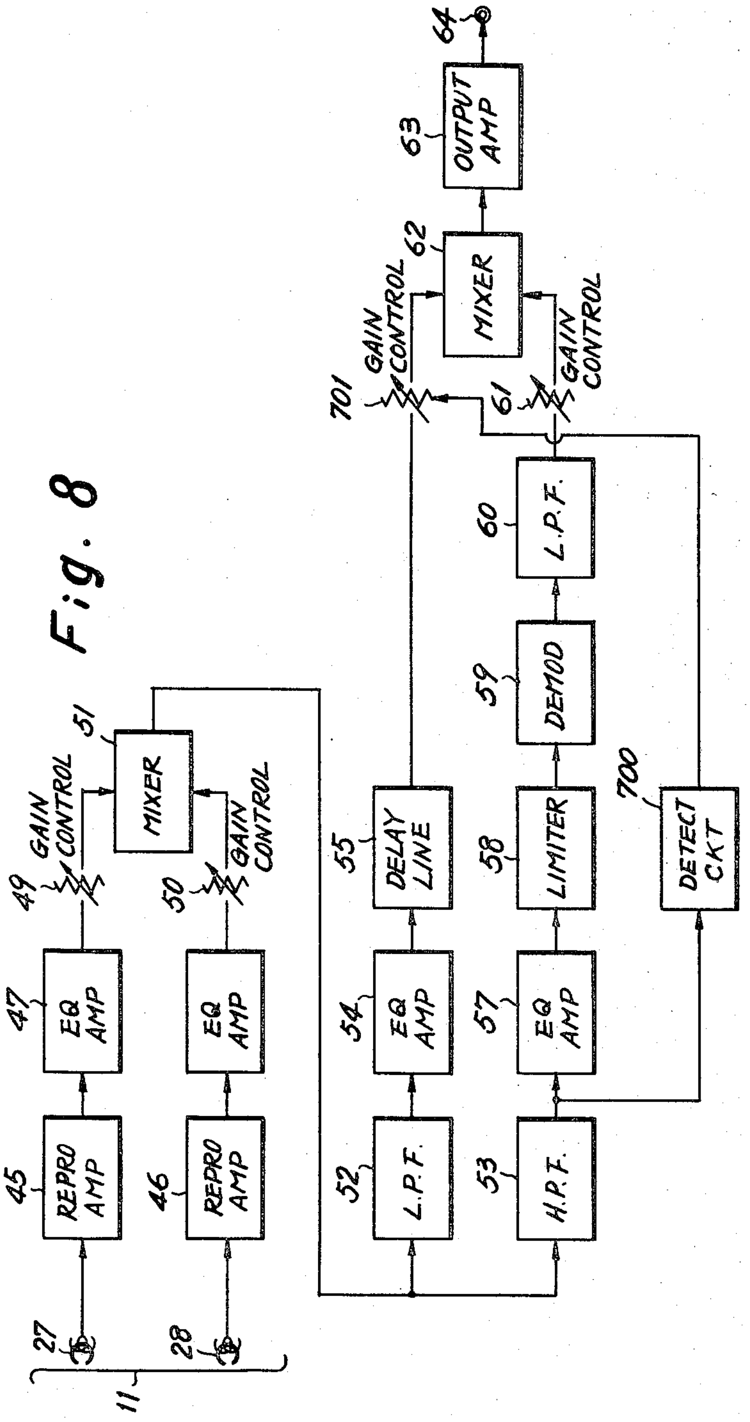
FIG. 8 is a block diagram of another embodiment of the reproducing system embodying the present invention.

Another embodiment of the reproducing system embodying the present invention will now be explained with reference to FIG. 8. The same reference characters are used to designate similar parts in FIGS. 5 and 8, and the description thereof is omitted.

As described in the preamble of this specification, if there are variations in contact between the magnetic tape 11 and the magnetic heads 27 and 28, unwanted amplitude variations appear in the signal reproduced by the magnetic heads 27 and 28. The unwanted amplitude variations are also caused in the reproduced signals by other causes. The causes are as follows: tracking errors in which the magnetic heads do not exactly trace on the tracks of the magnetic tape 11; and differences between the characteristics of the magnetic heads 27 and 28; etc. The level of the reproduced signal is varied by such amplitude variations. The resolution degree of a reproduced picture becomes worse when the level of the reproduced signal is small. When the level of the reproduced signal is excessively large, the reproduced picture appears quite rough. Flickers appear in the picture, caused by the characteristic differences of the magnetic heads. Moreover, if a recorded and reproduced signal is a color video signal, a degradation of color varies in the reproduced picture.

In the reproducing system as shown in FIG. 5, it is assumed that the signals reproduced by the magnetic heads 27 and 28 contain the amplitude variations as described above. The frequency modulated carrier wave (D) passed through the high-pass filter 53 has its unnecessary amplitude variations removed by the limiter 58. However, the high frequency band component (B) passed through the low-pass filter 52 requires the amplitude variations to convey items of information. Therefore, it is impossible to remove only the unnecessary amplitude variations, which occur owing to the outside influences, from the high frequency band component by means of the limiter.

In this embodiment, the above problem can be solved. It is possible to remove the unnecessary amplitude variations in the high frequency band component passed and filtered out through the low-pass filter 52. In FIG. 8, the output of the high-pass filter 53 is supplied, on the one hand, to the equalization amplifier 57. As described with reference to FIG. 5, the output of the equalization amplifier 57 is supplied to the mixer 62 after it passes through the limiter 58, the demodulator 59, the low-pass filter 60, and the gain control 61. On the other hand, the output of the high-pass filter 53 is also supplied to an amplitude variation detecting circuit 700.

The amplitude variations detected by the detecting circuit 700 are supplied to a gain control 701. The high frequency band component (C) filtered out by the low-pass filter 52 is supplied to the gain control 701 after it passes through the equalization amplifier 54 and the delay line 55. In the gain control 701, the high frequency band component supplied from the delay line 55 is adjusted its gain and controlled its amplitude automatically by the output of the detecting circuit 700.

In case that there are not unnecessary amplitude variations which occur owing to the outside embodiment in the signals reproduced by the magnetic heads 27 and 28, the frequency modulated carrier wave as of the output of the high-pass filter 53 have no amplitude variations. Then the output does not appear in the output side of the amplitude variation detecting circuit 700. At this time, the high frequency band component is not corrected for its unwanted amplitude variation when it passes through the gain control 701. However, in case that the signals reproduced by the magnetic heads 27 and 28 have unnecessary amplitude variations, the output signals of the low-pass filter 52 and the high-pass filter 53 have respectively the same unnecessary amplitude variations. Therefore, in this case, the unnecessary amplitude variations are effectively corrected and removed in the gain control 701.

The output signals of the gain controls 701 and 61 are mixed in the mixer 62 and then amplified through the output amplifier 63, similarly to the above embodiment. Thus, from the original video signal (A), unwanted amplitude variations are completely removed and no level variation is taken out through the output terminal 64.

One embodiment of the circuit diagram of the reproducing system shown in FIG. 8 will now be explained with reference to FIG. 9. The same reference characters are also used to designate similar parts in FIGS. 5, 8 and 9, and the description thereof is omitted.

The reproduced signal is supplied to the low-pass filter 52 and high-pass filter 53' from the mixer 51. The high-pass filter 53' has a circuit construction similar to that of the high-pass filter 53 as shown in FIG. 7. The frequency modulated low frequency band component (D) is filtered out from the signal which is supplied to a resistor 703 of the high-pass filter 53', and then appears in the emitter of a transistor 718. This output signal of the transistor 718 is supplied, on the one hand, to a equalization amplifying circuit 722 of IC (integrated circuit) in a equalization amplifier 57' after it being passed through a capacitor 721 from a junction point of resistors 719 and 720. On the other hand, the output signal of the transistor 718 is supplied through a line 767 to a terminal 728 of the amplitude variation detecting circuit 700. After the signal supplied to the equalization amplifier 57' is equalized and amplified here, the signal is supplied to the mixer 62 through the limiter 58, the demodulator 59, the low-pass filter 60, and the gain control 61.

The signal supplied to the terminal 728 of the detecting circuit 700 is applied through a capacitor 729 on the base of a transistor 734. The transistor 734 is set in a cut-off state at a time of no signal existence. The transistor 734 is in a conductive state responsive to the positive side of the signal applied on its base. An output appears in the collector of the transistor 734. The transistor 734 is in non-conductive state during the negative side of the applied signal. Therefore the transistor 734 performs a detection action and detects amplitude variations of the signal. A smoothing capacitor 731 is connected to the collector of the transistor 734. A signal detected according to the amplitude variations is supplied through a resistor 738 to the base of a transistor 747 in the gain control 701.

In the gain control 701, transistors 742 and 750 form an amplifying circuit of an emitter direct-coupled type. The emitters of the transistors 742 and 750 are respectively connected through diodes 743, 744 and emitter resistors 745, 746 to the collector of a transistor 747. The impedance of transistor 747 varies in accordance with the detected signal of the amplitude variations applied on the base of the transistor 747.

With the increasing of the base voltage of the transistor 747 in positive side, the impedance of this transistor becomes smaller, and the amplification degree of the amplifying circuit increases. On the contrary, with the decreasing of the base voltage of the transistor 747 in the negative side, the impedance of this transistor becomes larger, and the amplification degree of the amplifying circuit decreases. Moreover, the impedances of the diodes 743 and 744 vary in accordance with the variation of the collector voltage of the transistor 747. Thus the diodes 743 and 744 are assisting the gain controlling operation of the amplifying circuit with their impedance variations.

Therefore, in the gain control 701, the unnecessary amplitude variations of the high frequency band component supplied from the delay line 55 are completely corrected by the amplitude variations of the frequency modulated carrier wave which are detected in the detecting circuit 700. The output signal appearing in the collector of the transistor 747 has no unwanted amplitude variations other than the amplitude variations of items of the informations. The high frequency band component which is corrected, has an amplitude variation which is mixed in the mixer 62 with the low frequency band component supplied from the gain control 61. The original video signal, corrected to remove the unwanted amplitude variations, is taken out through the output terminal 64.

Next to be explained is a correction of the amplitude variations of color video signal having a pilot signal. In this case, the line 767 is not connected between the high-pass filter 53 and the amplitude variation detecting circuit 700. The reproducing system is further provided with a pilot signal detecting circuit 702. The detecting circuit 702 has an input side connected to the terminal 754 and an output side connected to the terminal 728 of the amplitude variation detecting circuit 700.

The reproduced signal supplied from the terminal 754 is applied through a capacitor 755 on the base of a transistor 758. A capacitor 759 and a coil 760 form a tuned circuit for tuning with the frequency of the pilot signal (4.3 MHz in this embodiment) in the reproduced signal. The capacitor 759 and the coil 760 are connected in parallel each other between the collector of the transistor 758 and a +12 volt line. A pilot signal is taken out through the emitter of a transistor 765, as an output of the pilot signal detecting circuit 702. The detected pilot signal is supplied to the terminal 728 of the amplitude variation detecting circuit 700.

If the signals reproduced by the magnetic heads 27 and 28 have unwanted amplitude variations, the detected pilot signal has also amplitude variations. Therefore, the amplitude variation detecting circuit 700 detects the amplitude variations of the pilot signal, which are similar to the detection of the amplitude variations of the frequency modulated carrier wave.

Similar to the above embodiment, the gain control 701 controls the gain of the high frequency band component with the detected signal of the detecting circuity 700 and corrects and removes the unwanted amplitude variations.

Figure 9:
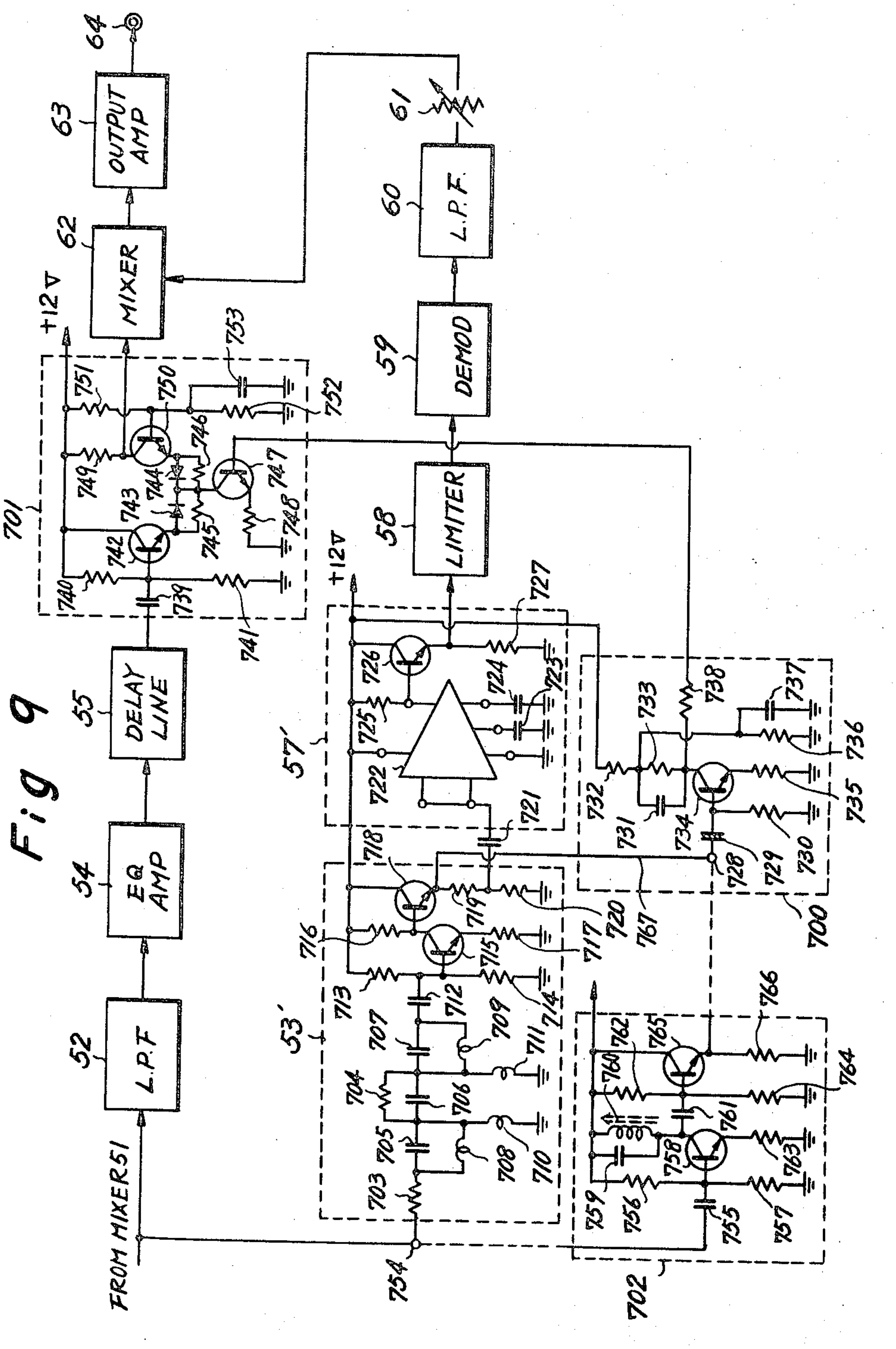
FIG 9 is a diagram of the embodiment made partly into a concrete circuit along the lines of the block diagram of FIG. 8.

The constants of the components parts of the circuits shown in FIG. 9 are as follows:

RESISTORS

| | | | |
|---|---|---|---|
| 703 | 1KΩ | 704 | 27KΩ |
| 713 | 10KΩ | 714 | 1.5KΩ |
| 716 | 22KΩ | 717 | 270Ω |
| 719 | 1.5KΩ | 720 | 680Ω |
| 725 | 1.5KΩ | 727 | 1.8KΩ |
| 730 | 10KΩ | 732 | 1KΩ |
| 733 | 10KΩ | 735 | 470Ω |
| 736 | 820Ω | 738 | 1KΩ |
| 740 | 47KΩ | 741 | 8.2KΩ |
| 745 | 100Ω | 746 | 100Ω |
| 748 | 100Ω | 749 | 1.2KΩ |
| 751 | 47KΩ | 752 | 8.2KΩ |
| 756 | 47KΩ | 757 | 3.9KΩ |
| 760 | 47KΩ | 762 | 47KΩ |
| 763 | 180Ω | 764 | 39KΩ |
| 766 | 1.5KΩ | | |

CAPACITORS

| | | | |
|---|---|---|---|
| 705 | 68pF | 706 | 20pF |
| 707 | 68pF | 712 | 0.01μF |
| 721 | 0.01μF | 723 | 0.033μF |
| 724 | 0.033μF | 729 | 5μF |
| 731 | 0.01μF | 737 | 50μF |
| 739 | 0.033μF | 753 | 0.01μF |
| 755 | 0.01μF | 759 | 100pF |
| 761 | 0.01μF | | |

INDUCTORS

| | | | |
|---|---|---|---|
| 708 | 33μH | 709 | 33μH |
| 710 | 22μH | 711 | 22μH |

TRANSISTORS

| | | | |
|---|---|---|---|
| 715 | 2SC460 | 718 | do |
| 726 | do | 734 | do |
| 742 | do | 747 | do |
| 750 | do | 758 | do |
| 765 | do | | |

DIODES

| | | | |
|---|---|---|---|
| 743 | OA90 | 744 | OA90 |

IC

| | |
|---|---|
| 722 | CA-3012 |

According to the present invention, a video signal is divided into two component bands before it is recorded, as described above in detail. One component band is directly recorded without being frequency modulated. A second component band is recorded after being frequency modulated. It will be appreciated that the present invention enables the recording of a frequency band video signal which is wider than the band which has hitherto been recorded with the conventional system in which the entire frequency band of the video signal is frequency modulated. For example, the frequency band can be increased by about 50 percent in the system embodying this invention as compared with the conventional system.

Some of the advantages of the invention should now be clear to those who are skilled in the art. Nevertheless, it might be well to here review them so that the record might be complete.

The inventive system makes use of an FM system, which ensures an improvement of the signal-to-noise ratio. Also, it ensures a removal from the signals of the level variations which ae caused by external influences. In other words, the picture can be reproduced in an extremely stable state.

An FM carrier wave has a bias effect. Thus, the recording and reproduction of the signal can be carried out with an extremely high sensitivity and a favorable signal-to-noise ratio, as described in the specification. It is impossible to use an AM carrier as bias in the manner of an FM system. Thus, an AM system requires an independent bias supply means. Since an AM system makes use of the level variations as items of recorded information, the bias cannot be satisfied with a constant level. The FM system ensures an improvement of the signal-to-noise ratio, with a result that the frequency of the carrier wave can extend up to a high frequency. Thus, the FM system provides the important advantage that a picture can be reproduced with a high resolution.

It is assumed that the reproduced signal has amplitude variations which occur owing to the external influences. In this case, unwanted amplitude variations are produced in a signal component which has no amplitude variations per se when there are no external influences. And, the same unwanted amplitude variations (as the above described variations) are also produced in a signal component having the amplitude variations as items of the information which is directly recorded and reproduced. In the system according to the present invention, the unwanted amplitude variations of the former described signal component are removed by the limiter and the unwanted amplitude variations of the latter described signal component are corrected and removed by the former unwanted amplitude variations. Therefore according to the present invention, there is obtained the reproduced signal which has no level variations, and the signal-to-nose ratio is satisfactorily improved.

It will be apparent to those skilled in the art that the invention is not to be limited to the described embodiments, since many modifications may be made. Therefore, it is contemplated that the appended claims will cover any modifications and all equivalents which fall within the true spirit and scope of this invention.

What we claim is:

1. A system for recording and reproducing a wide-band signal on a recording medium, said system comprising means for dividing said wide-band signal into a low frequency band component and a high frequency band component, modulator means responsive to said low frequency band component for frequency modulating a carrier wave, the lower frequency limit of the deviated carrier wave being substantially equal to or higher than the highest frequency of said high frequency band component of said wide-band signal, and means responsive to the high frequency component and the frequency modulated carrier wave produced by said modulator means for simultaneously recording on said recording medium at a level at which the frequency modulated carrier wave has a biasing effect with respect to the high frequency band component.

2. The system of claim 1 wherein said divider means divides said wide-band signal at a boundary frequency which is higher than 0.1 MHz and lower than one half the frequency of the highest frequency of said high frequency band component.

3. The system of claim 1 wherein said modulator means has an index of modulation which is more than unity.

4. The system of claim 1 and means connected to the input of said modulator means for restoring the DC component of said low frequency band component.

5. A system for recording and reproducing a wide-band signal on a recording medium, said system comprising means for dividing said wide-band signal into a low frequency band component and a high frequency band component, modulator means responsive to said low frequency band component for frequency modulating a carrier wave, the lower frequency limit of the deviated carrier wave being substantially equal to or higher than the highest frequency of said high frequency band component of said wide-band signal, mixer means responsive to said high frequency band component and the frequency modulated carrier wave produced by said modulator means for mixing said high and low bands, said mixing being accomplished at levels at which the frequency modulated carrier wave has a biasing effect with respect to the high frequency band component, recording means for recording the mixed signal on said recording medium, and reproducing means for reproducing the original wide-band signal from the signal recorded by said recording means.

6. The system of claim 5 in which said reproducing means comprises means for reproducing said recorded signal from said recording medium, means for separating said high frequency band component and said frequency modulated carrier wave in said reproduced signal, demodulator means for demodulating said frequency modulated carrier wave after it is separated from said high frequency band component, and mixer means for mixing said separated high frequency band component and said demodulated low frequency band component.

7. A system for recording and reproducing a wide-band of video signals on a recording medium, said system comprising means for dividing said wide-band signals into a low frequency band component including video signals and a high frequency band component of video signals, frequency modulator means having an index of modulation which is greater than unity for frequency modulating a carrier wave responsive to said low frequency band component of video signals, said modulation index changing the distribution of energy from the carrier frequency to the side band of said modulated wave, the lower frequency limit of the deviated carrier wave being substantially equal to or higher than the highest frequency of said high frequency band component of said wide-band signal, means responsive to the high frequency component and the frequency modulated carrier wave produced by said modulator means for simultaneously recording on said recording medium at a level at which the frequency modulated carrier wave has a biasing effect with respect to the high frequency band component, and means responsive to the bias of said frequency modulated signal for controlling the signal level of the high frequency band.

8. A system for recording and reproducing a wide-band signal on a recording medium, said system comprising means for dividing said wide-band signal into a low frequency band component containing video signals and a high frequency band component, frequency modulator means responsive to said low frequency band component for frequency modulating a carrier wave with a modulation index which redistributes the energy from the carrier frequency to increase the energy in the FM side band, the lower frequency limit of the deviated carrier wave being substantially equal to or higher than the highest frequency of said high frequency band component of said wide-band signal, mixer means responsive to said high frequency band component and the frequency modulated carrier wave produced by said modulator means for mixing said high and low bands, said mixing being accomplished at levels at which the frequency modulated carrier wave has a biasing effect with respect to the high frequency band component, recording means for recording the mixed signal on said recording medium, one of said signals being recorded at a level which is about 10 d.B. displaced from the level of the other signal, reproducing means for reproducing the original wide-band signal from the signal recorded by said recording means, said reproducing means limiting the FM signal to eliminate amplitude variations, and means responsive to said limited signal for eliminating recorder caused variations.

9. A method of recording and reproducing a very wide-band of signals comprising the steps of a. dividing the wide band of signals into two narrow bands of signals;

b. frequency modulating one of said narrow bands with said modulation being carried out at an index of modulation which redistributed carrier frequency energy into the side bands of said modulated wave form;

c. mixing said modulated and non-modulated narrow band of signals;

d. recording said mixed signals on a recording medium;

e. reproducing said recorded mixed signals from said recording medium;

f. separating said reproduced signals into the modulated and non-modulated narrow band of signals;

g. demodulating said reproduced modulated narrow band; and h. mixing said demodulated and reproduced non-modulated narrow band of signals and obtaining the original wide band of signals.

10. A system for magnetically recording and reproducing a wide-band signal on a magnetic medium, said system comprising means for dividing said wide-band signal into a low frequency band component and a high frequency band component, frequency modulator means responsive to said low frequency band component for frequency modulating a carrier wave with a modulation index which redistributes the energy from the carrier frequency to increase the energy in the FM side band, the lower frequency limit of the deviated carrier wave being substantially equal to or higher than the highest frequency of said high frequency band component of said wide-band signal, mixer means responsive to said high frequency band component and the frequency modulated carrier wave produced by said modulator means for mixing said high and low bands, said mixing being accomplished at levels at which the frequency modulated carrier wave has a biasing effect with respect to the high frequency band component, recording means for recording the mixed signal on said magnetic medium, and reproduction means for reproducing the original wide-band signal from the signal recorded by said recording means.

* * * * *